UNITED STATES PATENT OFFICE.

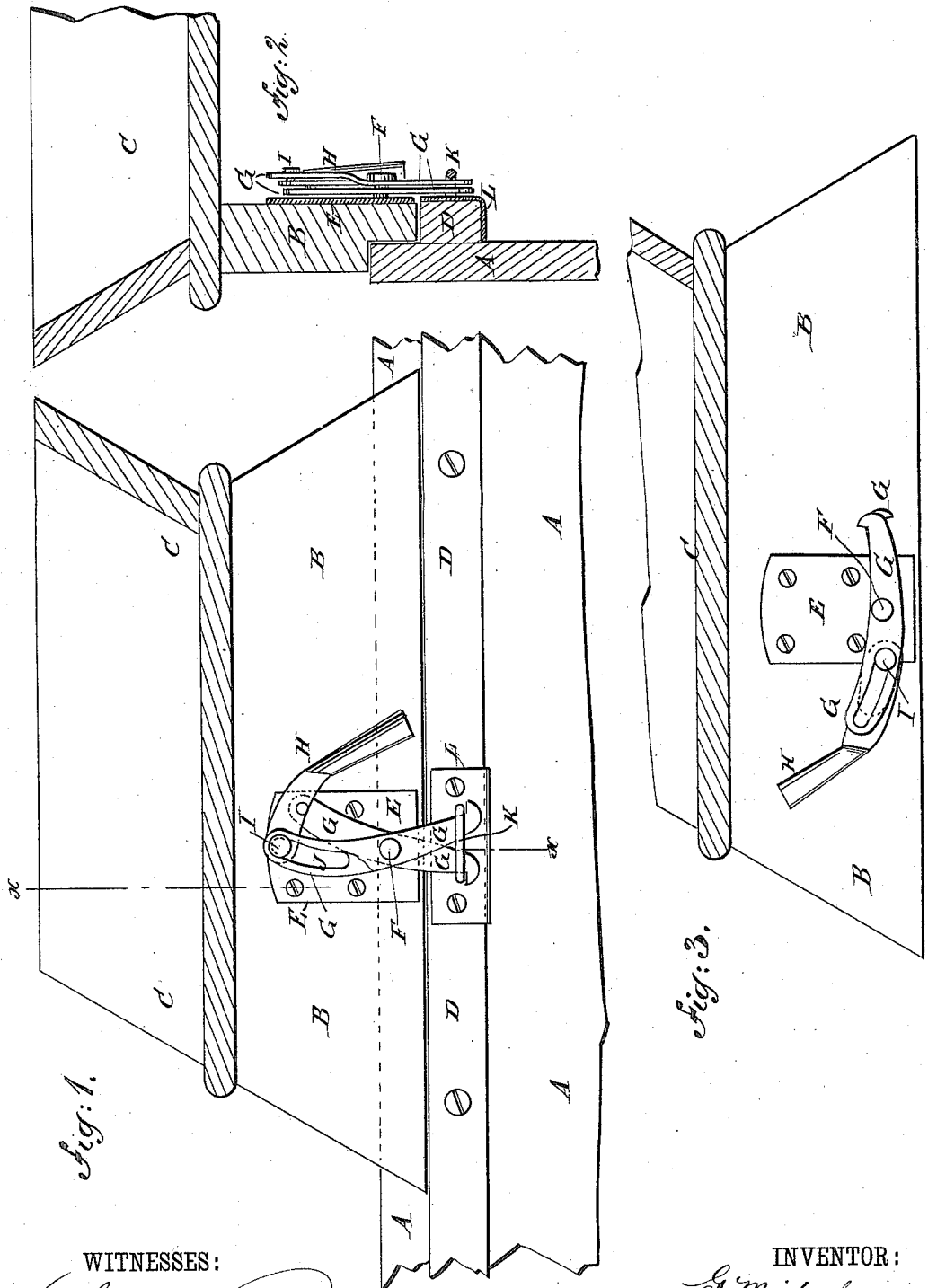

GOTTLIEB MAIBACH, OF TREMONT, ILLINOIS.

SEAT-LOCK.

SPECIFICATION forming part of Letters Patent No. 308,971, dated December 9, 1884.

Application filed August 11, 1884. (No model.)

*To all whom it may concern:*

Be it known that I, GOTTLIEB MAIBACH, of Tremont, in the county of Tazewell and State of Illinois, have invented a new and useful Improvement in Seat-Fastenings for Vehicles, of which the following is a full, clear, and exact description.

Reference is to be had to the accompanying drawings, forming a part of this specification, in which similar letters of reference indicate corresponding parts in all the figures.

Figure 1 is a side elevation of my improved fastening, shown as applied to a vehicle seat and body, the seat being shown in section, and part of the body being broken away. Fig. 2 is a sectional front elevation of the same taken through the line $x\ x$ Fig. 1. Fig. 3 is a sectional elevation of the seat, showing the fastening turned back to allow the seat to stand squarely when detached from the vehicle.

The object of this invention is to promote convenience and safety in securing seats to the bodies of buggies and other vehicles.

The invention consists in a seat-fastening constructed with two hooked bars pivoted to a plate by a single pivot, connected at their upper ends by a lever pivoted to the said ends, and provided with a keeper for the two hooked bars to engage with, whereby the fastening is adapted to be applied to the riser of a vehicle-seat and the body of a vehicle, as will be hereinafter fully described.

A represents the body, B the seat-riser, and C the seat of a vehicle. The lower edge of the riser B can be rabbeted to rest upon the upper edge of the body A and of a cleat, D, attached to the inner side of the said body near its upper edge, so that the seat C will be held from lateral movement; or the risers B can rest squarely upon the upper edge of the body A, and can be provided with flange-plates to hold the seat from lateral movement.

To the inner side of the seat-riser B is attached a plate, E, to which is pivoted, by a single pivot, F, two bars, G, having upon their lower ends hooks projecting in opposite directions, as shown in Figs. 1 and 3.

To the upper end of one of the hook-bars G is pivoted a lever, H, at a little distance from its forward end. To the forward end of the lever H is attached a rivet or pin, I, which passes through a slot, J, formed longitudinally in the upper part of the other hook-bar, G, as shown in Figs. 1 and 3, so that the hooked ends of the said bars G can be forced apart, as shown in Fig. 1, or drawn together, as shown in Fig. 3, by operating the said lever. To the cleat D, or to the body A, is attached a keeper, K, either directly or by means of a plate, L, to which the said keeper is attached, and which is secured to the said cleat or body. The keeper K is made of such a length that the two hooks, G, when drawn together can pass through it; but when spread apart will engage with the ends of the said keeper, as shown in Fig. 1, and cannot be withdrawn without being first drawn together. The hooks of the bars G are so formed that when spread apart and brought into contact with the ends of the keeper K they will draw the riser B down snugly upon the body A, so that the seat C will not rattle, even when there is no one sitting upon it. With this construction the hooks G can be readily drawn together and spread apart by operating the lever H, and when spread apart will be securely locked in place by the said lever, so that they will not be liable to become unfastened accidentally.

When the seat is detached from the vehicle-body, the hook-bars G can be swung upon the rivet F into a horizontal position, as shown in Fig. 3, so that the seat can stand squarely upon the lower edges of the risers.

Having thus described my invention, I claim as new and desire to secure by Letters Patent—

1. A seat-fastening constructed substantially as herein shown and described, and consisting of the hook-bars G, pivoted to the plate E by a single pivot, the lever H, connecting the upper ends of the said bars, and the keeper K, to receive the hooked lower ends of the bars, whereby the fastening is adapted to be applied to the riser of a vehicle-seat and the body of the vehicle, as set forth.

2. The combination, with the riser B, of a vehicle-seat, C, and the body A, of the vehicle, of the two hook-bars, G, pivoted to the plate E, the lever H, and the keeper K, substantially as herein shown and described, whereby the said seat can be readily secured to and released from the said vehicle, and will be securely held in place, as set forth.

GOTTLIEB MAIBACH.

Witnesses:
 A. J. DAVIS,
 D. C. AMES.